(12) United States Patent
Ochiai et al.

(10) Patent No.: US 6,424,109 B2
(45) Date of Patent: Jul. 23, 2002

(54) SUNROOF DRIVING DEVICE

(75) Inventors: Takao Ochiai, Ashikaga; Yasushi Yoshida, Kiryu; Masayuki Oota, Seta-gun, all of (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 09/780,838

(22) Filed: Feb. 9, 2001

(30) Foreign Application Priority Data

| Feb. 10, 2000 | (JP) | ................................. 2000-033474 |
| Feb. 10, 2000 | (JP) | ................................. 2000-033475 |
| Jun. 19, 2000 | (JP) | ................................. 2000-182815 |

(51) Int. Cl.[7] ........................... G05B 5/00; H02P 1/00; H02P 3/00; H02P 7/00; H02H 7/08
(52) U.S. Cl. ................... 318/445; 318/266; 318/286; 318/466
(58) Field of Search ................. 318/264–267, 318/286, 445, 466–469; 307/9.1, 10.1; 49/26, 28, 32

(56) References Cited

U.S. PATENT DOCUMENTS

| 4,700,982 A | * | 10/1987 | Kuraoka et al. ............. 180/281 |
| 4,835,449 A | * | 5/1989 | Huehn ........................ 296/223 |
| 6,028,370 A | * | 2/2000 | Lamm et al. ............... 307/10.1 |
| 6,183,040 B1 | * | 2/2001 | Imaizumi et al. ........... 296/155 |

FOREIGN PATENT DOCUMENTS

JP 2-23216 2/1990

* cited by examiner

Primary Examiner—Marlon T. Fletcher
(74) Attorney, Agent, or Firm—McCormick, Paulding & Huber LLP

(57) ABSTRACT

The sunroof driving device includes an electric motor, a worm gear provided on an armature shaft of the electric motor, a worm wheel gear meshing with the worm gear, an output shaft coupled with the worm wheel gear, and a drive gear which is provided on the output shaft and which meshes with a wire for driving a roof panel. A panel-position detecting mechanism for detecting the position of the roof panel and a tool hole for manually driving the roof panel in emergency are disposed coaxially with the output shaft. The tool hole is formed in the main shaft of the panel-position detecting mechanism. Also, the armature shaft is constituted so as to slide from the output shaft side, thus coupling the worm wheel gear and the output shaft with each other without any clutch interposed therebetween. The output shaft is provided with a fitting hole which provides the body-side manual operation section for manually driving the roof panel in emergency. The panel-position detecting mechanism is formed on the output shaft as a unit detachable therefrom and also has a tool hole as the unit-side manual operation section.

6 Claims, 8 Drawing Sheets

SUNROOF DRIVING DEVICE

BACKGROUND OF THE INVENTION

1. Field of the Invention

The present invention relates to a driving device for opening/closing a sunroof of an automobile, more particularly, technologies which can be applied effectively to a sunroof driving device having a manual opening/closing mechanism.

2. Description of the Related Art

Conventionally in a vehicle with a sunroof thereon, an opening is provided in a roof so that in this opening a roof panel formed by a roof material such as a steel plate or a glass material is arranged in a sliding manner. In this case, guide rails are provided at both edges of the opening, and shoes are mounted so as to slide along the guide rails. A roof panel and an end of a driving cable are fixed to the shoes. With this, by pushing/pulling the driving cable with an electric motor, opening/closing of the roof panel can be performed within the opening.

An armature shaft of the electric motor (hereinafter abbreviated as motor) is provided with a worm gear, and a worm wheel gear is arranged so as to mesh with the worm gear. The worm wheel gear is provided with an output shaft via a clutch mechanism such as a friction clutch. This clutch mechanism reduces cut-off torque and also prevents damage of the meshing portion with the worm gear in case of that the worm wheel gear is rotated during manual operation. The output shaft is provided with a driving gear, with which a driving cable is engaged, so that, by driving the motor, the driving cable is pushed and pulled, thus the roof panel is moved.

The full-closed and full-opened positions of the roof panel are both determined by a detection switch such as a limit switch. Japanese Patent Publication No. 61-46027 and Japanese Patent Publication No. 4-40213 disclose therein a configuration for turning this limit switch ON/OFF by using a certain type of K-H-V (S-C-P) planetary gear mechanism, so-called drunken gear mechanism. That is, the output shaft is provided with an eccentric external gear, to the outside of which is combined an internal gear having a more large number of gear teeth than the eccentric gear. On the outer periphery of the internal gear is formed a cam in such a configuration that the cam may contact with the limit switch according to the turning angle of the output shaft. With this, when the output shaft turns by a predetermined angle, the external gear slides accordingly, thus causing the internal gear to rotate by as much as a difference in the number of gear teeth between the two gears. Therefore, when the output shaft rotates by a predetermined number of revolutions, the cam crest moves to turn the limit switch ON/OFF, thus controlling the motor. Also, when the roof panel has to be tilted, it can be controlled in its tilt-up operation by appropriately changing the cam shape, the number of the limit switches, the switch configuration, and the like.

A configuration for detecting the position of the roof panel on the side of the output shaft is suggested also in Japanese Utility Model Laid-open No. 2-23216. By this utility model, on the side of the output shaft, an idle gear for detection is provided besides a driving device and has a cam formed thereon. With this, this cam is used to operate the limit switch, to detect the rotational position of the output shaft. Alternatively, there is given another configuration using an intermittent gear in place of the cam, where an intermittent gear is provided on the side of the output shaft besides the drive gear for detecting the position.

Further, recently, besides simple opening/closing operations, fine control is conducted such as full-opening/full-closing or tilting by one-shot operation or reverse driving of the roof panel in the case of catching-in of foreign materials. Such fine control has to be conducted such that the roof panel is not only opened or closed fully but also its current position is sensed in opening/closing. With this, in addition to the roof-panel position detection by use of the drunken gear mechanism, and the like, pulse control is also conducted by means of motor rotational detection.

In this case, to improve the accuracy of the pulse control, an armature shaft which has more large number of revolutions than other means among the driving devices is utilized to obtain pulses in such a way, for example, that the armature shaft is provided with a magnet to detect its proximity by a sensor such as a Hall IC, thus obtaining controlling pulses. With this, the limit switch signal and the pulse count are used to obtain the current position of the roof panel, to enable fine control based on the position of the roof panel. Also, when the number of motor revolutions dropped rapidly at a position other than the full-opened and full-closed positions, it is assumed that catching has occurred and, for example, such a control as reverse rotation of a motor can be performed.

On the other hand, in said sunroof and the like, if the roof panel cannot be opened or closed due to a failure of the motor or any other driving mechanism, the roof panel can be opened or closed manually as an emergency operation. For example, according to said Japanese Patent Publication No. 4-40213, in emergency, a tool is inserted into the shaft for manual operation, to enable manual opening/closing of the roof panel. That is, when the tool is inserted into the manual-operation shaft and pressed upward, the connection is cut off between the motor and the driving device to enable rotation only of the gear by the tool, in order to easily open or close the roof panel.

An opening/closing driving device according to such a configuration, however, has on the output shaft side an idle gear, an intermittent gear, a manual-operation shaft, and the like, besides the output shaft. As the result of this arrangement, there is a drawback that the gear configuration is too complicated with an increased projection area thereof to satisfy the requirements for miniaturization and light weight. Also, as the number of parts become numerous, there is another that the steps for assembling the gear become too complicated and increased, thus increasing the costs problematically.

Also, in detection of the position of the roof panel, for example, when the full-closed position is detected in a series of operations performed in the order of tilting-up, tilting-down, full-opening, full-closing, and tilting-up, the state where the roof panel stays in a full-closed state lasts only short as compared to the total travel of the roof panel driving cable. That is, in that state, the rotation angle of the driving device is very small when it is engaging with the cable, much less is the rotation angle of the drunken gear while it is decelerating that.

Although, on the other hand, deceleration by the drunken gear can be made efficient, when a predetermined rotation angle of the dependent member after being decelerated is to be detected, that rotation angle, even if it is small, is a wide one as the rotation angle of the output shaft before it is decelerated. To permit the output shaft to rotate by a wide angle, however, the range must be larger for detecting the full-closed position, thus enlarging and complicating the device.

Further, in the case of the opening/closing driving device having such a configuration, as a manual operation for emergency, and the like, only the output shaft side is rotated with the clutch mechanism to limit the rotation of the worm wheel gear. That is, the clutch mechanism is disposed between the worm wheel gear and the output shaft side, to limit by that much the position of providing the panel-position detecting means, thus giving rise to many restrictions in layout problematically.

Also, the panel-position detection means must often be arranged opposite the clutch mechanism with the body housing therebetween, in which case the clutch mechanism and the panel-position detecting means are assembled on the opposite side with the housing therebetween. Therefore, those components cannot be assembled as stacked one on the other in the same direction, thus deteriorating the workability of assembly problematically.

SUMMARY OF THE INVENTION

It is an object of the present invention to provide a small-sized sunroof driving device which has a small projection area and good assembling easiness.

It is another object of the present invention to improve the accuracy of detecting the roof panel position in such a sunroof driving device.

It is further another object of the present invention to provide a sunroof driving device which has a high degree of freedom in layout of its components and good assembling easiness, thus being easily applicable to various specifications.

The sunroof driving device according to the present invention is a sunroof driving device which comprises a motor, a worm gear provided on the armature shaft of said motor, a worm wheel gear which meshes with said worm gear, an output shaft coupled with said worm wheel gear, and a drive output section which is provided on said output shaft and which meshes with a wire for driving the roof panel for opening/closing an opening in the roof of a vehicle, characterized in that on the same axis with said output shaft are disposed a panel position detecting means for detecting the position of said roof panel and a manual operation section for driving said roof panel manually.

According to the present invention, the output shaft, the panel position detecting means, and the manual operation section are disposed on the same axis, to enable efficient and compact mounting of the panel position detecting means, the manual operation section, and the like. With this, the device has a smaller projection area and so can be miniaturized. Also, as those components are disposed on the same axis, each part can be stacked one on another in assembly, thus improving assembling easiness.

Also, said manual operation section may be formed on the main shaft of said panel position detecting means coupled with said output shaft, to thus enable assembling also the manual operation section only by attaching said panel position detecting means.

Further, said worm gear and worm wheel gear may be configured so that said armature shaft may be slid from the side of said output shaft. That is, the worm side may be driven from the wheel side by adjusting the lead angle and the friction angle of the worm wheel gear and the worm gear. With this, the clutch can be eliminated between the worm wheel gear and the output shaft, thus maintaining a correlation in terms of rotation angle between the output shaft and the armature shaft.

In addition, the sunroof driving device according to the present invention is characterized in that said panel position detecting means thereof includes a first dependent member which rotates integrally with said output shaft, a second dependent member which rotates when a rotation of said output shaft is decelerated and transmitted thereto, and a signal generating means which outputs a signal only when two rotational-position detecting sections respectively provided on said first and second dependent members come at a same position.

Thereby, the first dependent member with a higher rotation speed can be used to regulate an output time for the signal output from the signal generating means based on operations of the second dependent member with a lower rotation speed, thus setting the signal output time more accurately than a case using the second dependent member alone. Therefore, the accuracy can be improved of the detection signal indicating the position of the roof panel, thus sensing the current position of the roof panel more accurately.

Further, the sunroof driving device according to the present invention comprises a motor, a worm gear provided on an armature shaft of said motor, a worm wheel gear meshing with said worm gear, an output shaft coupled with said worm wheel gear, and a drive output section which is provided on said output shaft and which meshes with a wire driving a roof panel for opening/closing an opening in the roof of a vehicle, characterized in that it further has a body-side manual operation section provided on said output shaft for driving said roof panel manually, a panel-position detecting means formed as an independent unit for detecting the position of said roof panel, and a unit-side manual operation section which is disposed in said panel-position detecting means and interlocked with said body-side manual operation section to thereby enable manual sliding of said roof panel.

According to the present invention, the panel-position detecting means is formed as an independent section and there is provided the unit-side manual operation section interlocking with the body-side manual operation section provided on the output shaft, so that only by mounting the panel-position detecting means on the gear body, provisions for manual operation can be disposed on the driving device. Also, the panel-position detecting means is formed as a unit and, at the same time, the body-side manual operation section is provided on the output shaft, so that by attaching and detaching the panel-position detecting means, the driving device can easily accommodate such specifications that need no detection of the panel position, thus reducing the man-hour requirements in design and sharing the number of parts.

On the other hand, the panel-position detecting means and the output shaft may be formed detachable, to thereby improve the assembly performance of the panel-position detecting means further.

BRIEF DESCRIPTION OF THE DRAWINGS

Other characteristics and advantages of the present invention will become apparent from referring the detailed description given below, and the attached drawings wherein:

FIG. 7 is a time chart explaining a state where a position-detection signal is output in the panel-position detecting mechanism of FIG. 4, wherein

DESCRIPTION OF THE PREFERRED EMBODIMENTS

First Embodiment

Figure 1:
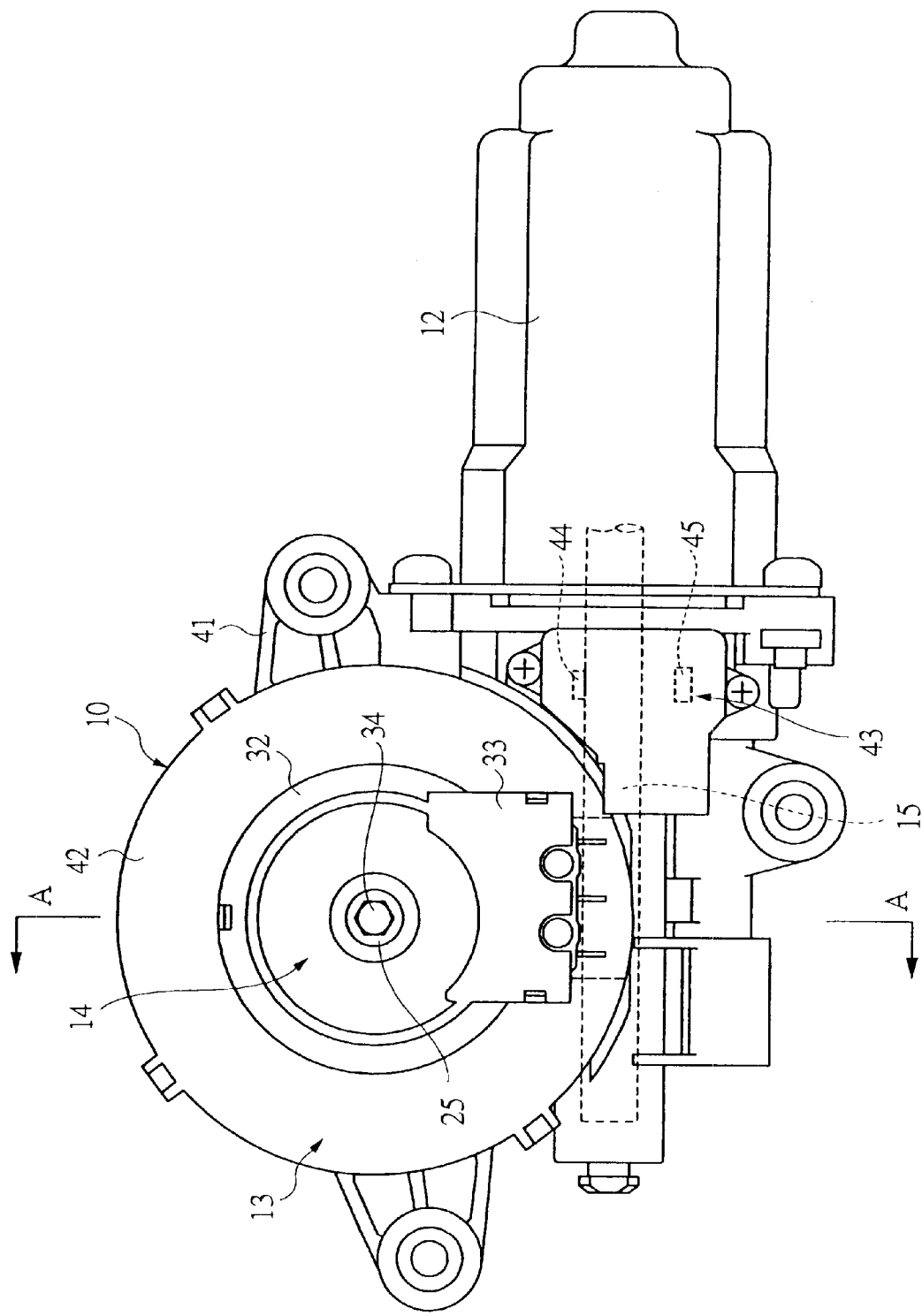
FIG. 1 is a plan view showing a configuration of a first embodiment of a sunroof driving device according to the present invention.
Figure 2:
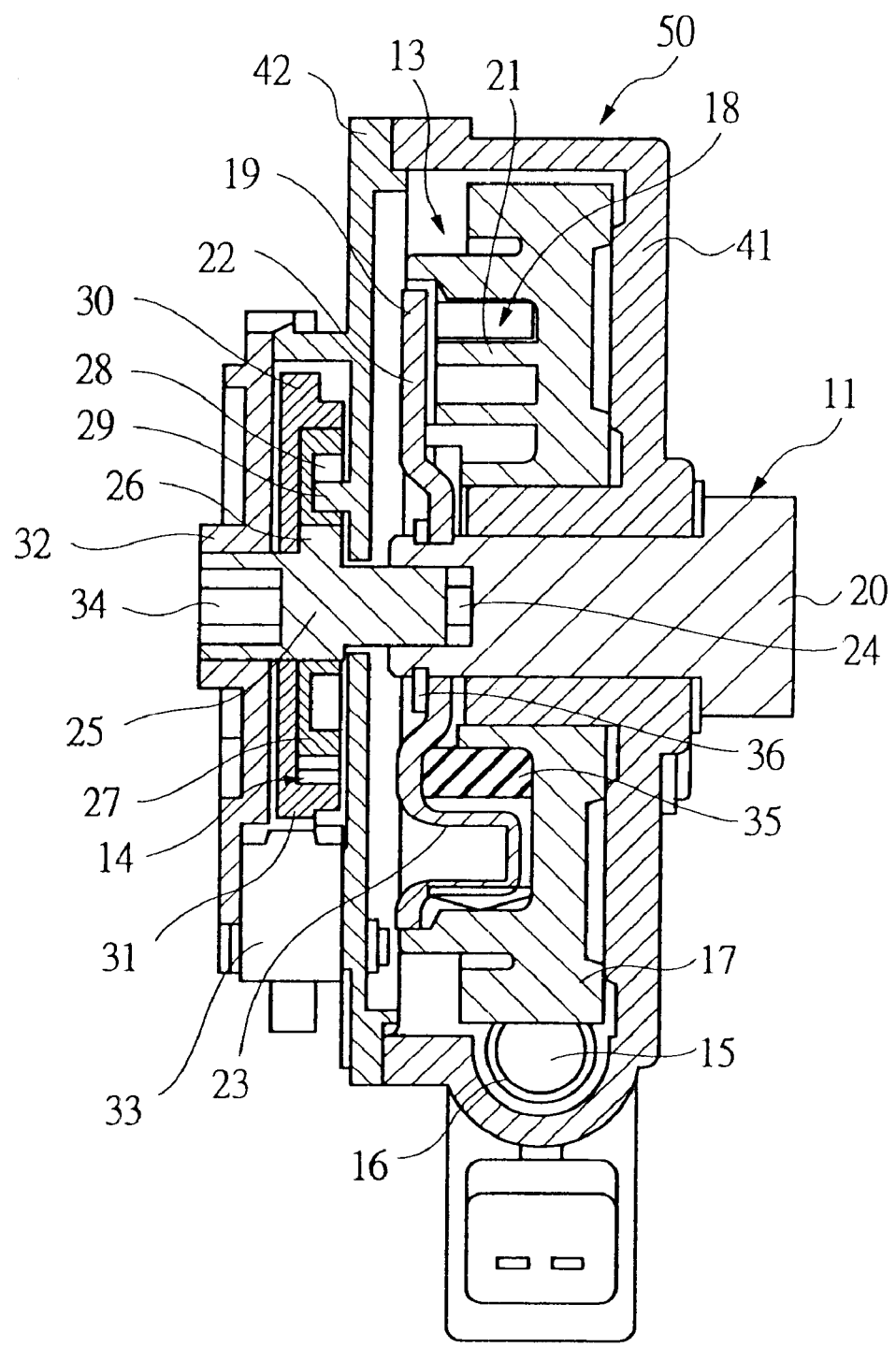
FIG. 2 is a cross-sectional view taken along line A—A of FIG. 1.

The following will describe in detail the embodiments of the present invention with reference to the drawings. FIG. 1 is a plan view showing a configuration of a first embodiment of the sunroof driving device according to the present invention, FIG. 2 is a cross-sectional view taken along A—A of FIG. 1, and FIG. 3 is a plan view of a roof of a vehicle provided with a sunroof.

Figure 3:
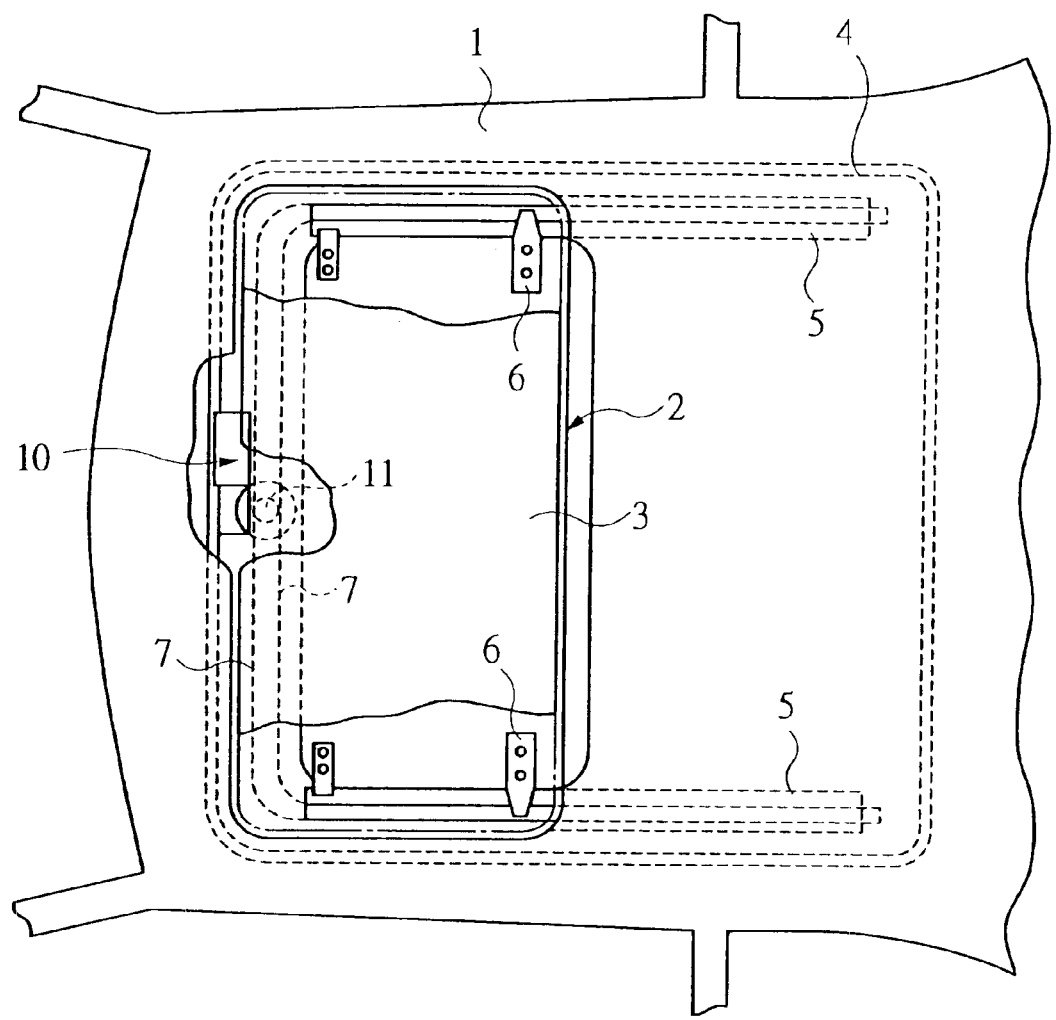
FIG. 3 is a plan view showing a roof of a vehicle provided with a sunroof.

As shown in FIG. 3, a roof 1 of a vehicle has an opening 2 formed therein. The opening 2 is provided with a roof panel 3 attached therein in a sliding manner so that the opening can be opened and closed. Note here that the roof panel 3 may be formed with a steel plate like in the case of the roof material or with glass.

Around the opening 2 is provided an attaching frame 4 for the roof pane 13. The attaching frame 4 has a guide rail 5 attached thereto. The roof panel 3 is fixed to a shoe 6, which slides along the guide rail 5. To the shoe 6 is fixed one end of a driving cable 7. The driving cable 7 engages at a round the middle thereof with a drive gear (drive output section) 11 of a sunroof driving device (hereinafter abbreviated as driving device) 10. Then, when the drive gear 11 rotates, the driving cable 7 is pushed or pulled, to thereby move the shoe 6 along the guide rail 5, then opening/closing the roof panel 3.

The driving device 10 comprises in configuration an electric motor (hereinafter abbreviated as motor) 12, a transmitting mechanism 13, and a panel-position detecting mechanism (panel-position detecting means) 14. The motor 12 is provided with an armature shaft 15, which is a rotation output shaft of the motor 12, and has a worm gear 16 formed thereon.

Also, the motor 12 is provided with a motor-pulse detecting section 43. In this case, the armature shaft 15 is mounted with a magnet 44 and also has a Hall IC 45 as a sensor in its vicinity. Then, when the armature shaft 15 rotates, the magnet 44 comes near and goes off from the Hall IC 45, thus generating a pulse signal. Therefore, by accurately detecting the number of rotations of the armature shaft 15 and synchronizing this shaft with the panel-position detecting mechanism 14, the current position of the roof panel 3 can be determined to thereby provide accurate and precise control.

The transmitting mechanism 13 has such a configuration as to house and arrange in a gear housing 41 a worm gear 16, a work wheel gear 17, and a driven plate 19. Also, as shown in FIG. 2, at the left end thereof a gear case 42 is attached and, on the outside thereof the panel-position detecting mechanism 14 is dispose.

The worm wheel gear 17 meshes with the worm gear 16, to thus obtain a large reduction gear ratio against the motor 12. Also, the worm wheel gear 17 is connected via a damper mechanism 18 to the driven plate 19, which is in turn fixed to an output shaft 20 having a drive gear 11.

The damper mechanism 18 comprises engaging protrusions 21 and 23 and a damper rubber 35 fitted thereto. In this configuration, on the left side surface of the worm wheel gear 17 in FIG. 2 are evenly spaced the three engaging protrusions 21 with an angular spacing of 120 degrees therebetween. Also, the driven plate 19 comprises a disc-shaped base 22 and the engaging protrusion 23, which is evenly spaced as many as three at an angular spacing of 120 degrees and protruded from the base 22. Also, between the worm wheel gear 17 and the driven plate 19 is interposed the damper rubber 35 having six holes therein and to which the engaging protrusions 21 and 23 are fitted, thus constituting the damper mechanism 18.

With this configuration, when the motor 12 is actuated to rotate the worm gear 16, at first the worm wheel gear 17 meshing therewith rotates. Then, its rotation is transmitted through the engaging protrusion 21, the damper rubber 35, and the engaging protrusion 23 to the driven plate 19, thus rotating the output shaft 20.

At the end opposite to the drive gear 11 of the output shaft 20 is disposed the panel-position detecting mechanism 14. In this case, as the panel-position detecting mechanism 14 utilizes a planetary gear mechanism consisting of a so-called drunken gear, thus making up a compact configuration. Therefore, the panel-position detecting mechanism 14 can be integrated into the present device without largely changing the layout of the motor size. Also, the mechanism itself is formed as a single unit, thus enabling appropriate detaching and attaching of the panel-position detecting mechanism 14 without changing the other components.

As shown in FIG. 2, at the left end of the output shaft 20 is formed a fitting hole 24 with a hexagonal section. To the fitting hole 24 is fitted an end of a main shaft 25 of the panel-position detecting mechanism 14. And, the output shaft 20 and the main shaft 25 are coupled with each other on the same axis, thus rotating integrally with each other.

The main shaft 25 has a disc-shaped eccentric section 26, formed integrally therewith, having a central axis eccentric from the main shaft 25, and to which an external gear 27 is mounted. The external gear 27 has a fitting hole 28 therein, to which a pin 29 protruded on a gear case 42 is fitted with a desired play margin. That is, the external gear 27 is restricted from self-rotating by the pin 29. Then, when the main shaft 25 rotates, the external gear 27 deviates in motion by as much as an eccentricity quantity of the eccentric section 26, thus swinging according to said play margin.

Outside of the external gear 27, a cam gear 30 having a larger number of gear teeth than n (for example, 1) number of external gear teeth 27 is disposed in a rotary manner with the main shaft 25 as a center of rotation. Further, at the outer periphery of the cam gear 30 is formed a cam crest 31. Also, to the outside of the cam gear 30 are attached a cover 32 and a limit switch 33 as facing against the cam crest 31.

In the panel-position detecting mechanism 14, when the main shaft 25 rotates, the external gear 27 swings correspondingly. The external teeth of the external gear 27 mesh with the internal teeth of the cam gear 30, so that the cam gear 30 rotates by as much as n number of teeth for each swinging movement of the external gear 27. In this embodiment, it is so set that when the main shaft 25 rotates 16 times, the cam gear 30 rotates one time. Then, when this cam gear 30 rotates, its cam crest 31 abuts against the limit switch 33, to turn it ON/OFF. Note here that in the driving device 10, the switch and the cam crest 31 are so set that the limit switch 33 is turned ON when the roof panel 3 is closed full.

At the end of the main shaft 25 of the panel-position detecting mechanism 14, on the other hand, a tool hole (a unit-side manual operating section) 34 is formed for inserting a tool for manual operation. That is, in the driving device 10 according to the present invention, on the same axis as the output shaft 20 are disposed the panel-position detecting mechanism 14 and the tool hole 34 in configuration. Note here that the tool hole 34 is formed so as to have the same diameter as the fitting hole 24.

In a later described driving device 60 according to a third embodiment of the present invention, the unit of the panel-position detecting mechanism 14 is omitted, so that this fitting hole 24 functions as a manual operating section for emergency. In this driving device 10, on the other hand, the unit-side manual operating section is interlocked with the body-side manual operating section, thus permitting manual operation through the tool hole 34.

In said prior art driving device, the clutch mechanism is interposed between the worm wheel gear 17 and the output shaft 20 to reduce cut-off torque and prevent damage, and the like, of the worm gear 16. Therefore, the clutch mechanism runs idly if the motor 12 will continue rotation when the system is restricted in a full-closed or full-opened state. In this state, the armature shaft 15 would rotate despite that the output shaft 20 and the panel-position detecting mechanism 14 are stopped. Therefore, a correlation between the armature shaft 15 and the output shaft 20 is lost, thus disabling synchronization between the two components.

Also, during manual operation, as mentioned above, only the output shaft 20 rotates with the armature shaft 15 in the stopped state. Therefore, despite no pulse is output from the motor-pulse detecting section 43, the output shaft 20 rotates, so that in this case also a correlation between the two components is lost, thus disabling synchronization between them.

In such an event, the current position of the roof panel 3 cannot be determined on the basis of a pulse count, thus disabling accurate opening/closing control problematically. To correct this, also, zero resetting must be once performed at the full-opened and full-closed positions, thus making opening/closing operations troublesome problematically. Further, said idle running cannot be predicted on where in a travel of the roof panel 3 it may occur, so that in order to conduct control by taking it into account, a very complicated control mechanism is necessary.

To guard against this, in this driving device 10, the clutch mechanism used in the prior art one is omitted, to make setting so that the worm gear 16 can be driven from the side of the worm wheel gear 17. That is, the lead angle and the friction angle of the worm wheel gear 17 and the worm gear 16 are adjusted and, at the same time, the size, the material, the grease, and the like, of thrust bearings supporting the armature shaft 15 are adjusted, to enable reverse rotation from the side of the worm wheel gear 17. Also, although the damper rubber 35 is interposed, the worm wheel gear 17 is directly coupled with the output shaft 20 and no clutch mechanism is interposed between them. Therefore, during manual operation also, the armature shaft 15 rotates together with the output shaft 20, thus preventing the correlation between them from being lost.

That is, during manual operation, when a tool is inserted through the tool hole 34 in the main shaft 25 to rotate it, the drive gear 11 rotates to operate the driving cable 7, thus opening/closing the roof panel 3. In this case, when the panel-position detecting mechanism 14 is operative, the armature shaft 15 rotates together with the output shaft 20, thus causing the motor-pulse detecting section 43 also output the pulse signal. Therefore, during manual operation also, it is possible to synchronize the signal from the panel-position detecting mechanism 14 and the pulse signal from the motor-pulse detecting section 43. Therefore, in following control also, it is possible to control the system accurately while determining the current position of the roof panel 3.

The driving device 10 is assembled roughly as follows. That is, at first, the motor 12 and the motor-pulse detecting section 43 are attached to the gear housing 41. Next, with the right side of the gear housing 41 as placed downward in FIG. 2, the output shaft 20 is inserted into the gear housing 41 from its lower side. After this output shaft 20 is thus inserted, the worm wheel gear 17, the damper rubber 35, and the driven plate 19 are sequentially fitted and inserted into the gear housing 41 from the upper side (left side in FIG. 2). At that time, the engaging protrusions 21 and 23 are alternately fitted into the six holes in the damper rubber 35, to dispose the damper rubber 35 between the worm wheel gear 17 and the driven plate 19.

After these components are mounted to the output shaft 20, a C-ring 36 is attached from the upper side of the gear housing 41 to prevent removal of the driven plate 19, and the like. Then, a gear case 42 is attached to the gear housing 41 at its end from its upper side.

The panel-position detecting mechanism 14, on the other hand, is given in a unit beforehand and assembled separately. With this, the unit of the panel-position detecting mechanism 14 is attached on the gear case 42. When the panel-position detecting mechanism 14 is attached, the end of the main shaft 25 is inserted into the fitting hole 24 in the output shaft 20 to integrate them with each other, thus assembling the output shaft 20 and the main shaft 25 so that they may be interlocked with each other. Thereby, manual operation is possible through the tool hole 34 in the main shaft 25. At that time also, the limit switch 33 is attached to the gear case 42.

Thus, in the driving device 10, after the output shaft 20 is inserted, the following assembly jobs can all be conducted in one direction, i.e. from the upper side of the gear housing 41. Also, as the panel-position detecting mechanism 14 is given in a unit and, the output shaft 20 is on the same axis as the main shaft 25, the panel-position detecting mechanism 14 can be assembled easily.

Further, at the end of the main shaft 25 of the panel-position detecting mechanism 14 is formed the tool hole 34 for manual operation, so that only by attaching the panel-position detecting mechanism 14, a manual operating section can be provided. Also, since the panel-position detecting mechanism 14 and the tool hole 34 are disposed on the same axis as the output shaft 20, the projection areas of the panel-position detecting mechanism 14 and the manual operating section can be reduced. Therefore, the panel-position detecting mechanism 14 and the manual operating section can be contained within the projection area of the driving device 10, thus enabling its miniaturization.

Second Embodiment

Figure 4:
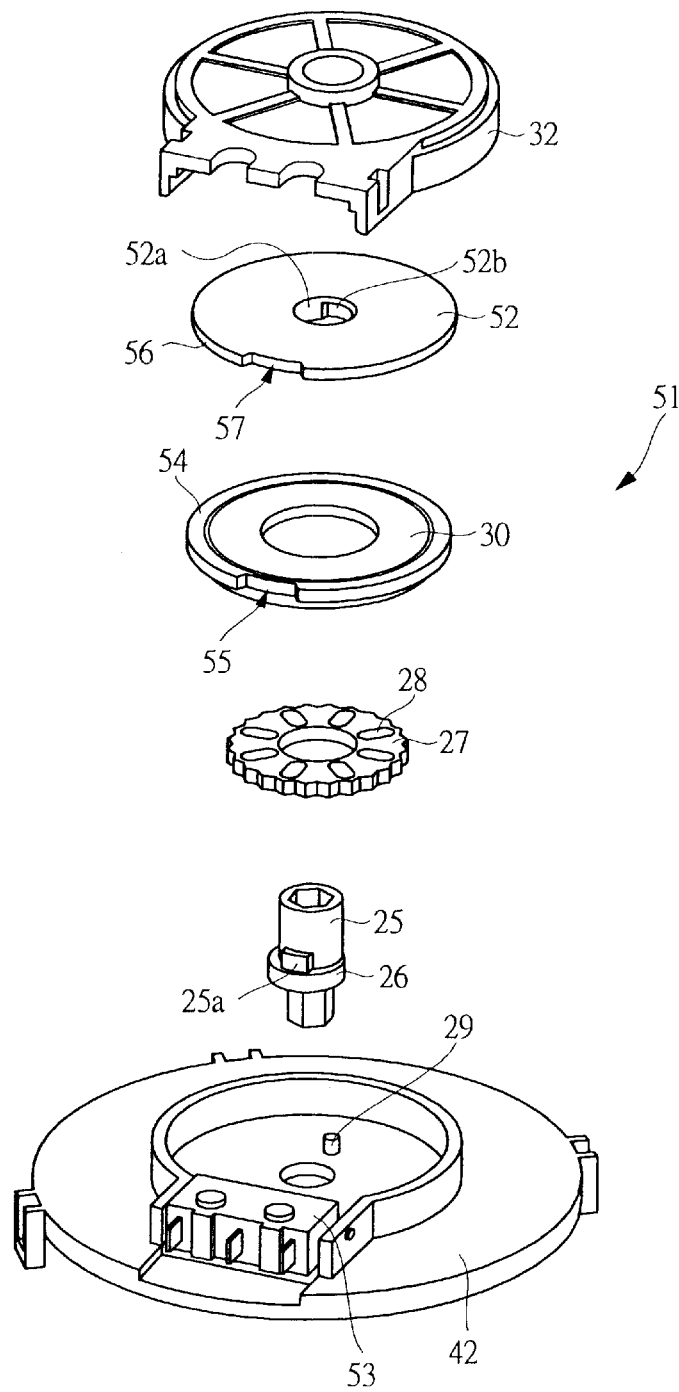
FIG. 4 is an exploded perspective view showing a configuration of a panel-position detecting mechanism of the sunroof driving device according to the a second embodiment of the present invention.
Figure 5:
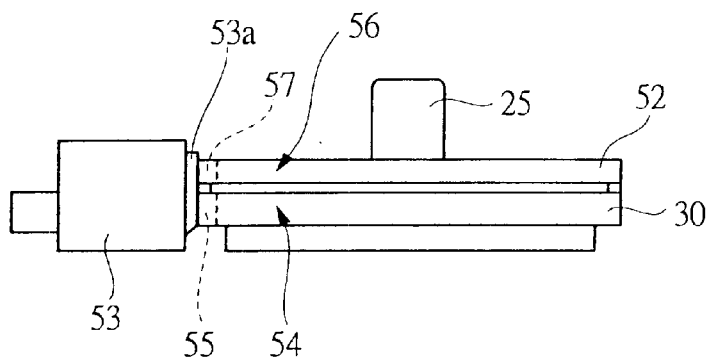
FIG. 5 is a side view of the panel-position detecting mechanism of FIG. 4.

The following will describe a second embodiment of a sunroof driving device according to the present invention which is improved in terms of accuracy for detecting the position of the roof panel in the panel-position detecting mechanism. FIG. 4 is an exploded perspective view showing a configuration of the panel-position detecting mechanism of the sunroof driving device according to the second embodiment of the present invention and FIG. 5 is a side view of the panel-position detecting mechanism of FIG. 4. In these figures, the same elements and components as those in the first embodiment are indicated by the same reference numerals and their description is omitted here.

A panel-position detecting mechanism (panel-position detecting means) 51 shown in FIG. 4 is formed by stacking the external gear 27, the cam gear (second driven member) 30, and the driven plate (first driven member) 52 on the gear case 42 with the main shaft 25 as a center and placing the cover 32 thereon. In this case also, the main shaft 25 is provided with the eccentric section 26 formed eccentrically thereto. And, the external gear 27 is mounted in a relatively rotating manner. With one of a plurality of long-groove shaped engaging holes 28 formed in the external gear 27 is engaged the pin 29 of the gear case 42 in a sliding manner. Also, on the gear case 42 is disposed the limit switch (signal producing means) 53 similar to that in the first embodiment.

Figure 6:
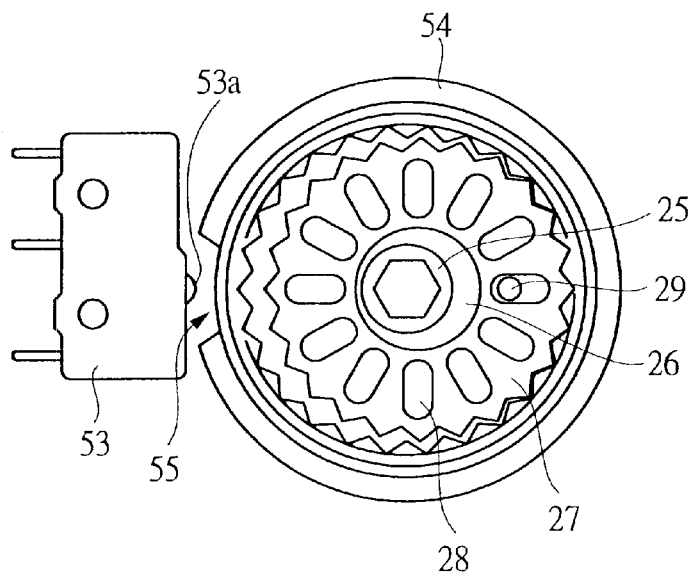
FIG. 6 is a plan view showing a state where a driven plate is detached in the panel-position detecting mechanism of FIG. 4.

As shown in FIG. 6, outside the external gear 27, the cam gear 30 having a larger number of internal teeth than the external gear 27 is disposed in a rotary manner with the main shaft 25 as a center. The external gear 27 and the cam gear 30 are formed as a drunken gear mechanism like in the case of the first embodiment in such a configuration that the cam gear 30 rotates when a rotation of the main shaft 25 coupled to the output shaft 20 is decelerated and transmitted thereto. Note here that FIG. 6 is a figure as viewed from the above with the driven plate 52 and the cover 32 as removed, thus giving the same configuration as the panel-position detecting mechanism 14 of the first embodiment.

On the outer periphery of the cam gear 30 is formed the cam 54. This cam 54 is provided with a notch (rotational-position detecting section) 55. The cam 54 except the notch 55 comes in contact with a switch section 53a of the limit switch 53, to turn it ON. At the notch 55, on the other hand, the cam 54 is separated from the switch section 53a, to turn the limit switch 53 OFF.

On the upper side of the cam gear 30 is disposed the driven plate 52. In the inner periphery of an axial hole 52a of the driven plate 52 is formed a fitting hole 52b. This fitting hole 52b is fitted with an engaging protrusion 25a formed on the outer periphery of the main shaft 25. Thereby, the driven plate 25 rotates integrally with the main shaft 25. In this case, the main shaft 25 is coupled with the output shaft 20 as in the case of FIG. 2, so that the driven plate 52 rotates integrally with the out put shaft 20. In this panel-position detecting mechanism 51, the cam gear 30 and the driven plate 52 are thus supported by the single main shaft 25, thus providing such a configuration that the positional accuracy of both components with a positional correlation therebetween can be easily obtained.

On the outer periphery of the driven plate 52 also, the cam 56 having a notch (rotational-position detecting section) 57 is formed. In this case, the switch section 53a of the limit switch 53 extends vertically in FIG. 5 so as to come in contact with both of the cams 54 and 56. Therefore, except at the notch 57, the cam 56 of the driven plate 52 also comes in contact with the switch section 53a of the limit switch 53, while at the notch 57, the cam 56 is separated from the switch section 53a in configuration.

With these cams 54 and 56, the switch section 53a goes free only when the notch 55 or 57 is superposed thereon, thus turning the limit switch 53 OFF. That is, unless the notch 55 or 57 is not superposed, the switch section 53a is pushed in by either one of the cams, thus holding the limit switch 53 in ON state. Note here that the notches 55 and 57 are so set that the limit switch 53 is turned OFF when the roof panel 3 is closed full.

In the panel-position detecting mechanism 51 also, when the main shaft 25 rotates, the external gear 27 swings correspondingly, so that for each swinging of the external gear 27, the cam gear 30 rotates by as much as a difference in the number of gear teeth. In this second embodiment, a reduction gear ratio is set in such a manner that the cam gear 30 makes one revolution each time the main shaft 25 rotates thirteen times.

In contrast thereto, the driven plate 52 rotates integrally with the main shaft 25. That is, the driven plate 52 and the cam gear 30 rotate at a speed ratio of 13:1. Therefore, both cams 54 and 56 also rotate at this speed ratio, so that the notches 55 and 57 coincide with each other each time the driven plate 52 rotates thirteen times.

Figure 7A:
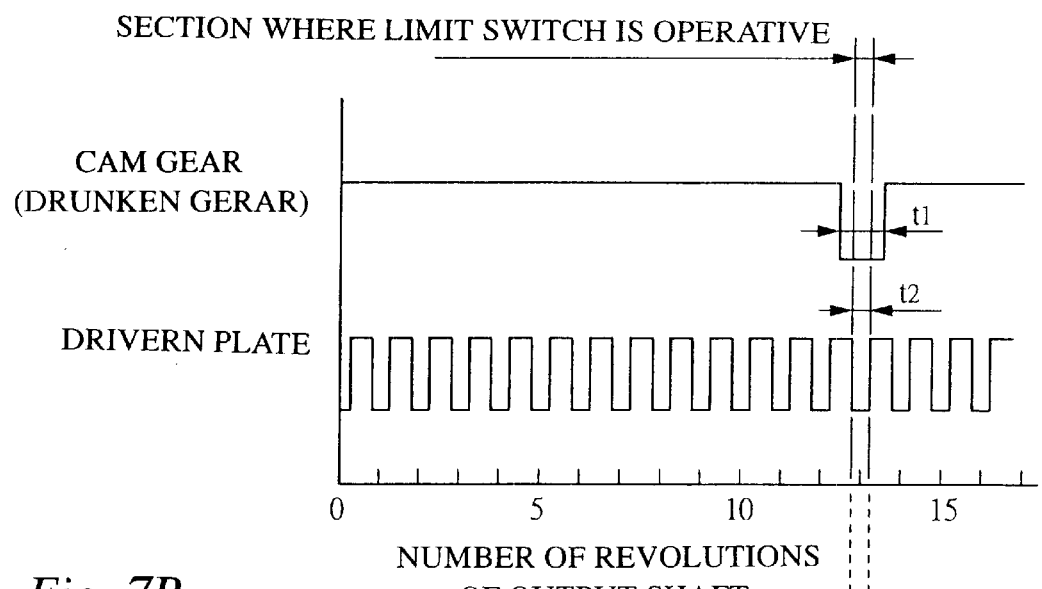
FIG. 7A shows the output signal when both of cams are respectively provided independently and FIG. 7B shows the output signal when both of the cams are used in combination.
Figure 7B:
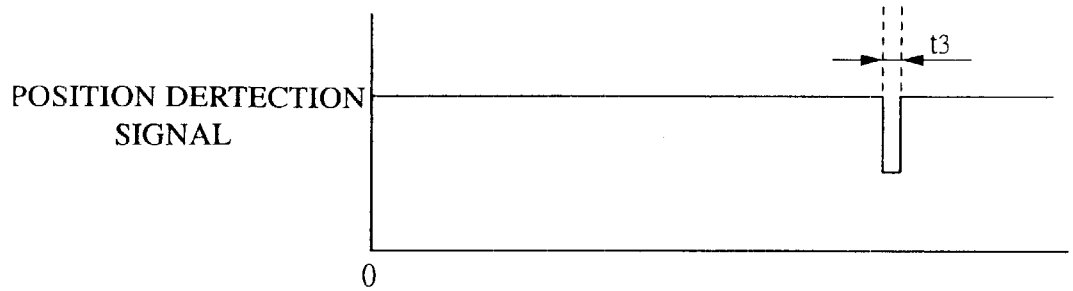

FIG. 7 is a time chart explaining the output state of the position-detection signal in the panel-position detecting mechanism 51, FIG. 7A indicates a timing of the output signal in a case where the cams 54 and 56 are provided alone respectively and FIG. 7B indicates a timing of the output signal in a case where the cams 54 and 56 are both used simultaneously. As shown in FIG. 7, when the cam 54 of the cam gear 30 is used alone, each time the output shaft 20 rotates thirteen times, the notch 55 moves to the position of the switch section 53a, to turn the limit switch 53 OFF. That is, when the output shaft 20 rotates thirteen times, the roof panel 3 is closed fully, which is detected when the limit switch 53 is turned OFF at the notch 55. When the cam 56 of the driven plate 52 is used alone, on the other hand, each time the output shaft 20 makes one revolution, the notch 57 moves to the position of the switch section 53a, to turn the limit switch 53 OFF.

In this case, when the cam 54 is used alone, as shown in FIG. 7A, the cam gear 30 rotates slowly due to the reduction gear ratio, thus prolonging the switch-OFF time ($t_1$). Therefore, as mentioned above, when the cam 54 is used alone in detection of the position of the roof panel, the accuracy of detecting the full-closed position is deteriorated. In contrast thereto, when the cam 56 of the driven plate 52 is used alone, its rotation speed is high, so that although the switch-OFF time ($t_2$) is short, a signal is output each time when the output shaft 20 makes one revolution.

Then, therefore, this panel-position detecting mechanism 51 uses both cams 54 and 56, so that the limit switch 53 may be turned OFF only when the notches 55 and 57 of the respective cams 54 and 56 coincide with each other. That is, by taking logical-AND of both OFF-times, the OFF-time ($t_1$) by the cam 54 is regulated on the basis of the OFF-time ($t_2$) by the cam 56. Thereby, as shown in FIG. 7B, the position-detection signal can be output only in the time $t_2$ ($t_3$) contained in the time $t_1$, to narrow the time range of the detecting signal as compared to the case where the cam 54 is used alone ($t_3 < t_1$; $t_2 = t_3$). Therefore, the accuracy can be improved of the detecting signal indicating the full-closed position of the roof panel 3, there by determining the current position of the roof panel 3 more accurately.

Also, the output time ($t_3$) of the position-detection signal is determined by the OFF-time ($t_2$) of the driven plate 52, thus enabling relatively generous setting the accuracy of meshing between the external gear 27 and the cam gear 30. Therefore, the gears 27 and 30 can both be formed with roughly triangular teeth, thus simplifying the device configuration and reducing its costs.

Third Embodiment

Figure 8:
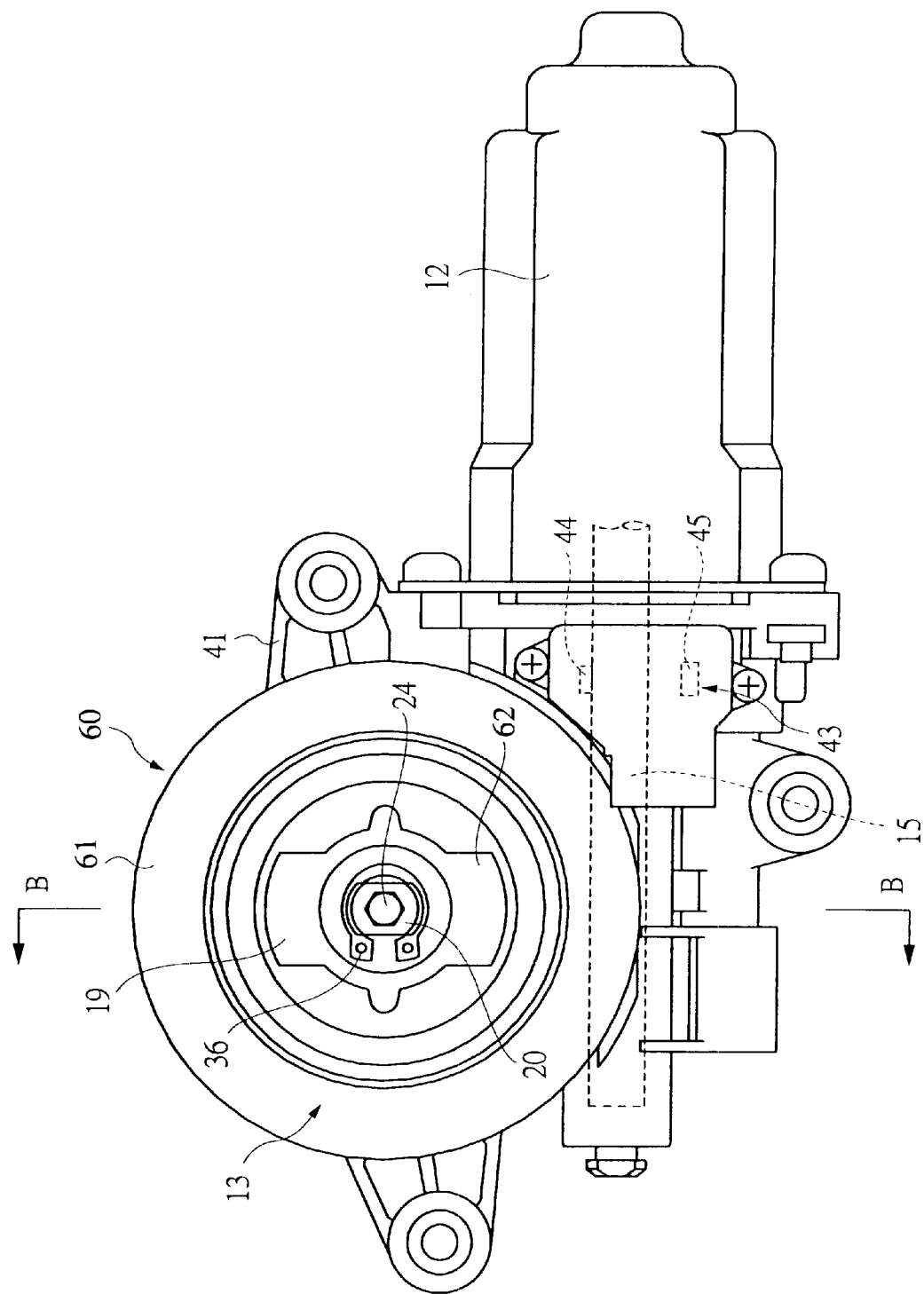
FIG. 8 is a plan view showing a configuration of the sunroof driving device according to a third embodiment of the present invention.
Figure 9:
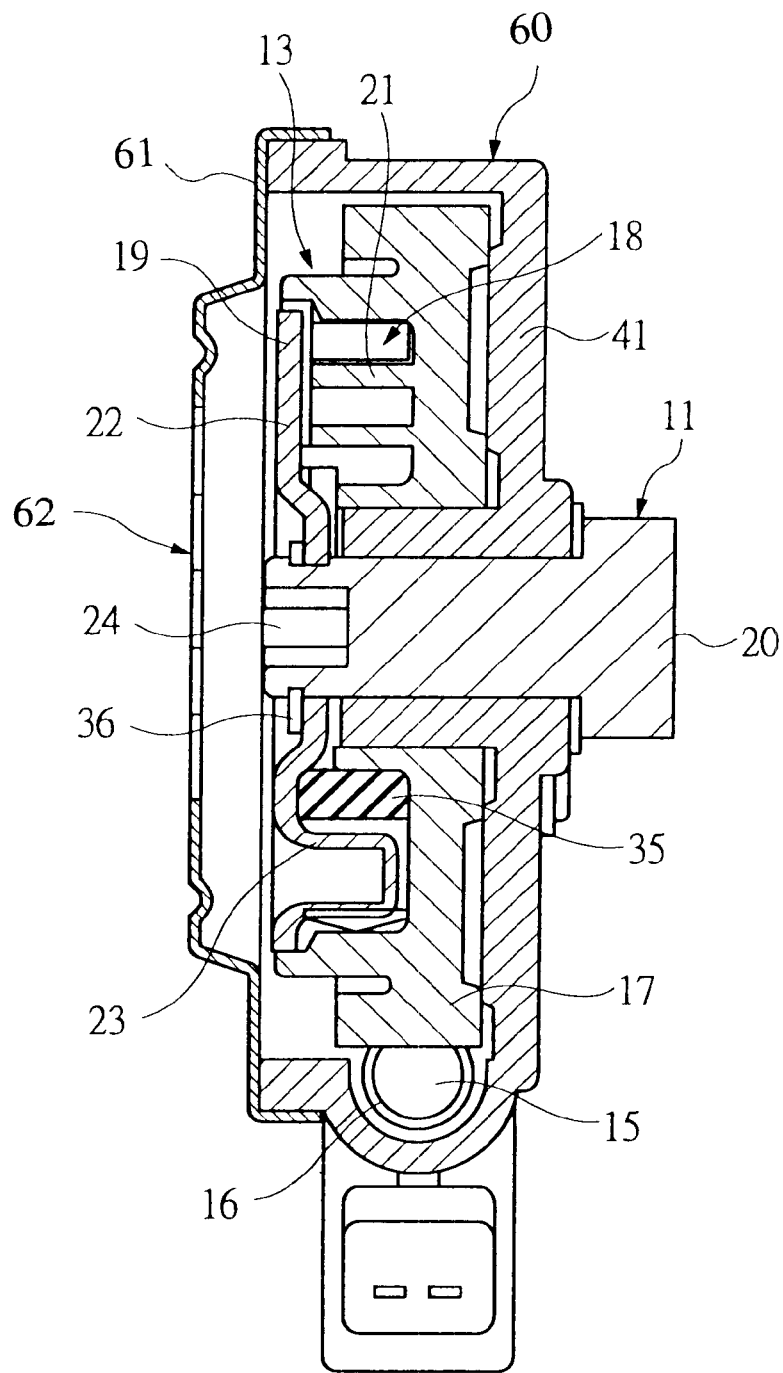
FIG. 9 is a cross-sectional view taken along B—B of FIG. 8.

The following will describe a third embodiment of the sunroof driving device having no panel-position detecting mechanism 14. FIG. 8 is a plan view showing a configuration of the third embodiment of the sunroof driving device according to the present invention and FIG. 9 is a cross-sectional view taken along B—B of FIG. 8. In these figures, the same elements and components as those of the driving device 10 of the first embodiment are indicated by the same reference numerals and so their description is omitted here.

A driving device 60 of this embodiment has omitted the panel-position detecting mechanism 14 from the driving device 10 shown in FIGS. 1 and 2. That is, the panel-position detecting mechanism 14 assembled as a unit and formed separately from the device body is omitted in configuration according to the desired specifications.

In this case, at the left end of the gear housing 41 in FIG. 2 is attached a cover 61. Also, at the middle of the cover 61 is formed an opening 62, through which are viewed the output shaft 20 and the fitting hole 24 as the body-side manual operation section. And, in manual operation, a tool can be inserted through the opening 62 and fitted to the fitting hole 24, thus directly rotating the output shaft 20.

In such a manner, the driving device according to the present invention can easily accommodate the specifications of "position detection not required" only by removing the unit of the panel-position detecting mechanism 14. That is, without separate designing according to the specifications, the gear housing 41 and other device body-side components can be used as they are, thus accommodating a variety of specifications. Therefore, the design man-hour requirements can be reduced and the elements can also be shared in use, thus reducing product costs thereof.

Also, like in said embodiments, in this embodiment also, assembly jobs after the output shaft 20 is inserted can all be performed from the upper side of the gear housing 41. Therefore, in this case also, the assembly jobs are easy to do, thus reducing the man-hour requirements for assembly.

Note here that in the driving devices 10 and 60, the motor-pulse detecting section 43 can also be detached appropriately and determined whether it is necessary or not according to required specifications. Therefore, the driving device according to the present invention is capable of appropriately selecting any of the following four types of specifications:

(1) The panel-position detecting mechanism 14 and the motor-pulse detecting section 43 are attached;
(2) The panel-position detecting mechanism 14 is provided (the motor-pulse detecting section 43 is not provided);
(3) The motor-pulse detecting section 43 is provided (the pulse-position detecting mechanism 14 is not provided); and
(4) No panel-position detecting mechanism 14 and motor-pulse detecting section 43 are provided.

Although the present invention has been specifically described with reference to its embodiments, the present invention is not limited to these embodiments but may be modified in various manners within the scope thereof.

For example, in contrast to said embodiment where said panel-position detecting mechanism 14 has such setting that each time the main shaft 25 rotates thirteen times, the cam gear 30 makes one revolution, the number of the gear teeth may be changed appropriately. Also, as the detection section of the panel-position detecting mechanism 14, in place of the cam crest 31 and the limit switch 33, a stop ring may be disposed on the outer periphery of the cam gear 30, to slide an electric contact, thereby detecting the position.

Further, although the second embodiment has employed such a configuration that the panel-position detecting mechanism 51 uses one limit switch 53, it may be provided one for each cam so that its output signal may be taken AND in electrical processing. Also, the length of the notches 55 and 57 need not always be the same but maybe formed as small as possible with in an operative range of the limit switch 53, thus improving the signal accuracy.

Further, although said embodiment has formed the tool hole 34 on the same axis as the main shaft 25 of the panel-position detecting mechanism 14 in said driving device 10, the two components need not always be provided on the same axis but another axis may be provided for manual operation. Also, as the panel-position detecting mechanism 14, not only said so-called drunken gear mechanism but also an intermittent gear or any other detecting means may be applied appropriately.

According to the sunroof driving device of the present invention, the output shaft, the panel-position detecting mechanism, and the manual-operation tool hole are disposed on the same axis, thus enabling efficient and compact mounting of the panel-position detecting mechanism and the manual operating section. With this, the projection area of the gear as whole can be made small, thus miniaturizing it. Also, since those components are provided on the same axis, they can be stacked one on another, thus improving the assembling easiness.

The tool hole which provides the manual-operation section, on the other hand, is formed on the main shaft of the panel-position detecting mechanism coupled with the output shaft, to enable assembling also the manual operation section only by attaching the panel-position detecting mechanism, thus further improving the assembling easiness.

In addition, the panel-position detecting mechanism is constituted by the driven plate which rotates integrally with the output shaft and the cam gear which rotates when a rotation of the output shaft is decelerated and transmitted thereto, both of which are each provided with a cam having a notch thereon, so that only when these notches coincide with each other, the limit switch may output a signal to cause the driven plate with a lower rotation speed to regulate the output time for the position-detection signal from the limit switch. Therefore, the accuracy of the detection signal indicating the position of the roof panel can be improved, thus determining the current position of the roof panel more accurately.

Further, in the sunroof driving device according to the present invention, the panel-position detecting mechanism is formed as an independent unit, to which is provided a unit-side manual operation section interlocked with the body-side manual operation section provided on the output shaft, thus enabling providing the driving device with various provisions for manual operation only by mounting the panel-position detecting mechanism to the device body.

Also, the panel-position detecting means is given as a unit and the output shaft is provided with a fitting hole as the body-side manual operation section, so that the specifications which does not require panel position detection can be accommodated easily by detaching and attaching the panel-position detecting mechanism, thus reducing the man-hour requirements in design and sharing the element in use.

Further, the panel-position detecting mechanism is formed detachable from the output shaft, thus enabling further improving the assembling easiness of the panel-position detecting mechanism.

What is claimed is:

1. A sunroof driving device comprising:

an electric motor;

a worm gear provided on an armature shaft of said electric motor;

a worm wheel gear meshing with said worm gear;

an output shaft coupled with said worm wheel gear; and a drive output section which is provided on said output shaft and which meshes with a wire for driving a roof panel to open and close an opening in a roof of a vehicle;

wherein panel-position detecting means for detecting a position of said roof panel and a manual operation section for driving said roof panel manually are disposed coaxially with said output shaft.

2. The sunroof driving device according to claim 1, wherein said manual operation section is formed on a main shaft of said panel-position detecting means coupled with said output shaft.

3. The sunroof driving device according to claim 1, wherein said worm gear and said worm wheel gear are constituted in such a way that said armature shaft can be driven from a side of said output shaft.

4. The sunroof driving device according to claim 1, wherein said panel-position detecting means includes a first driven member which rotates integrally with said output shaft, a second driven member to which a rotation of said output shaft is transmitted through a speed reduction and which rotates, and signal producing means which outputs signal only when rotational-position detecting sections provided respectively on said first and second driven members come to the same position with each other.

5. A sunroof driving device comprising:

an electric motor;

a worm gear provided on an armature shaft of said electric motor;

a worm wheel gear meshing with said worm gear;

an output shaft coupled with said worm wheel gear; and a drive output section which is provided on said output shaft and which meshes with a wire for driving a roof panel to open and close an opening in a roof of a vehicle; said sunroof driving device further comprising:

a body-side manual operation section provided on said output shaft for driving said roof panel manually;

panel-position detecting means formed as an independent unit for detecting a position of said roof panel; and a unit-side manual operation section disposed in said panel-position detecting means and interlocked with said body-side manual operation section, for allowing drive of said roof panel manually.

6. The sunroof driving device according to claim 5, wherein said panel-position detecting means is formed as attachable and detachable to and from said output shaft.

* * * * *